United States Patent Office 3,278,774
Patented Oct. 11, 1966

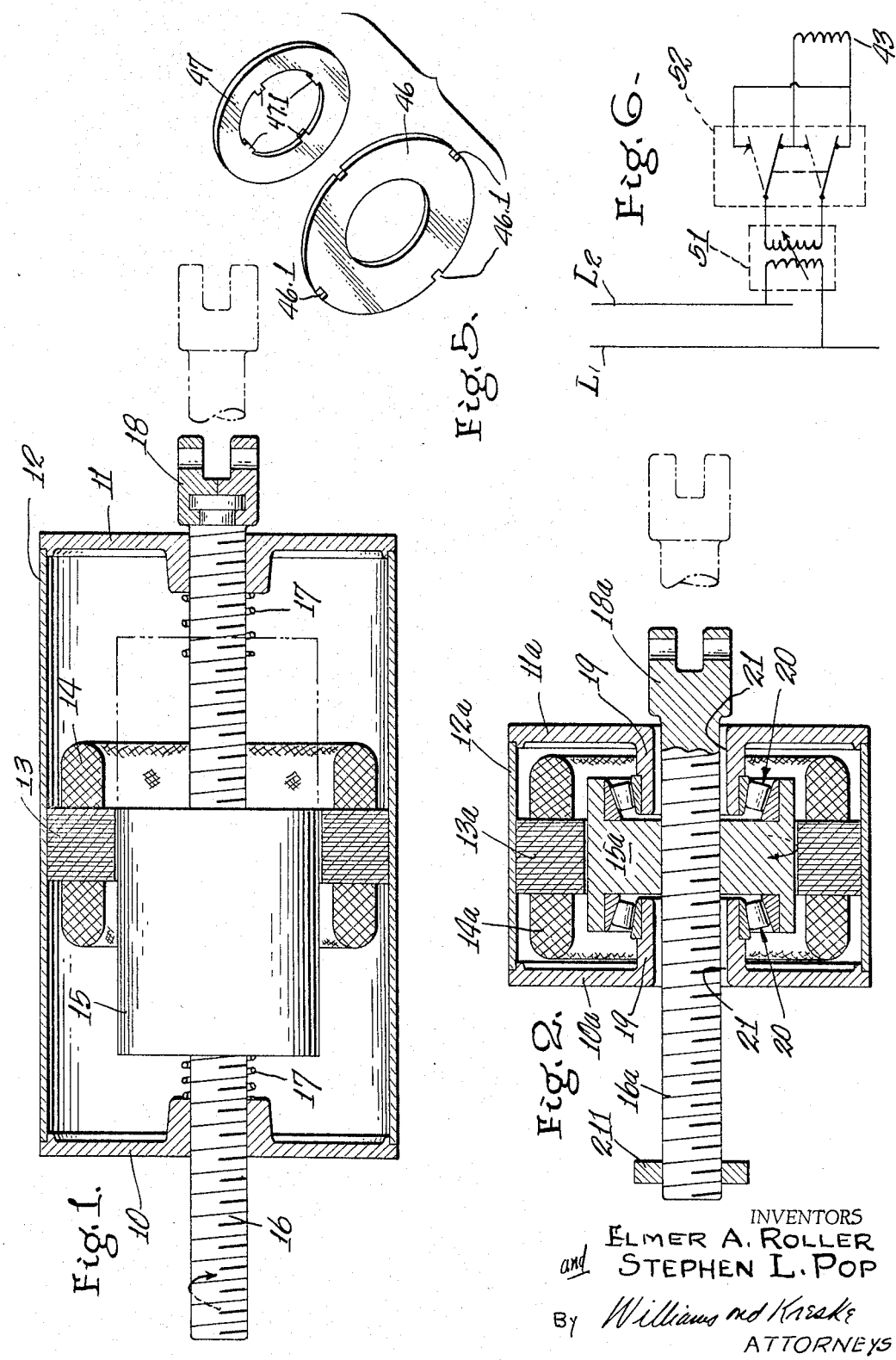

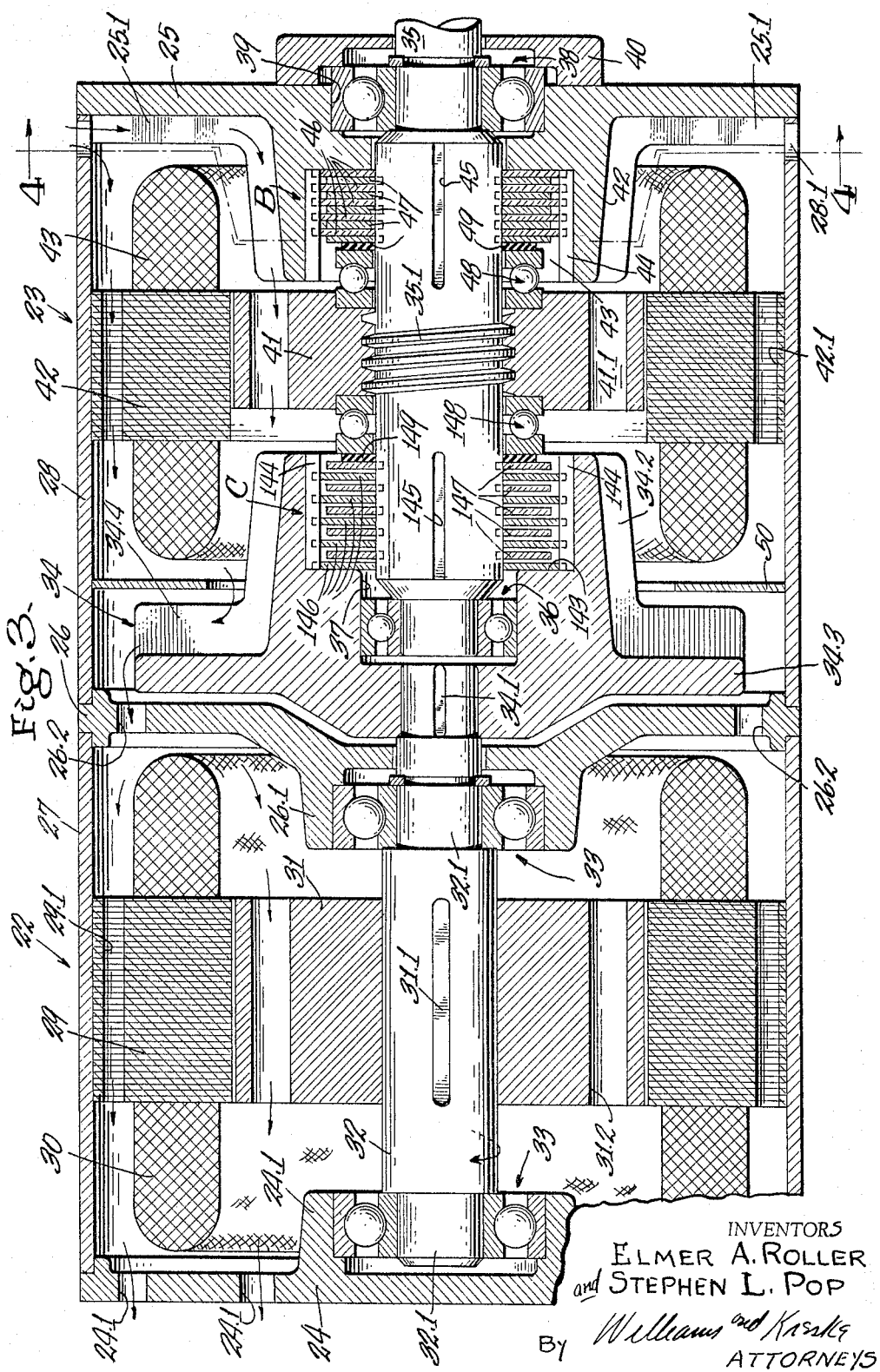

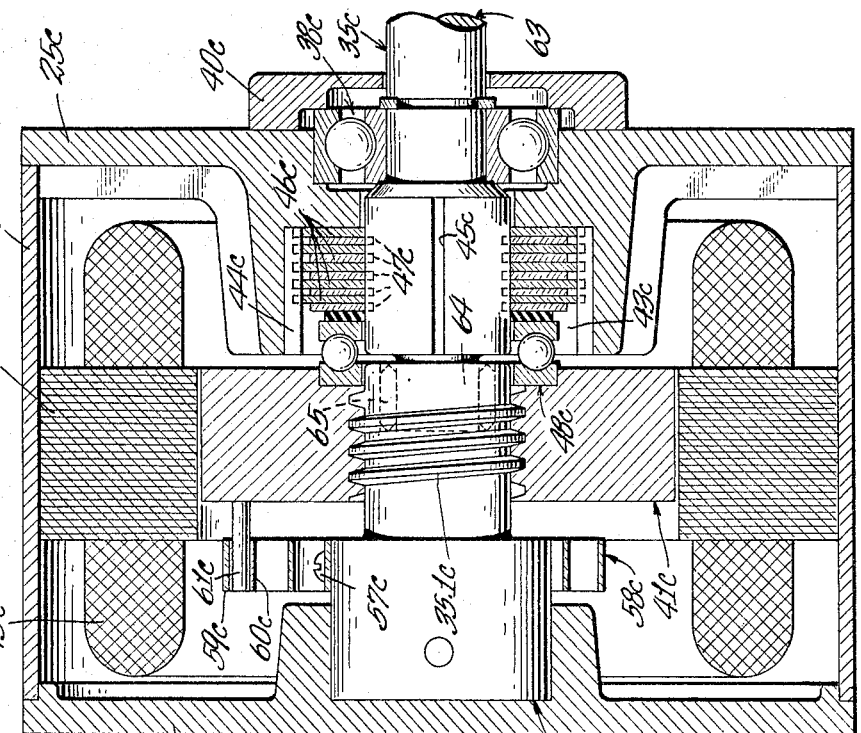
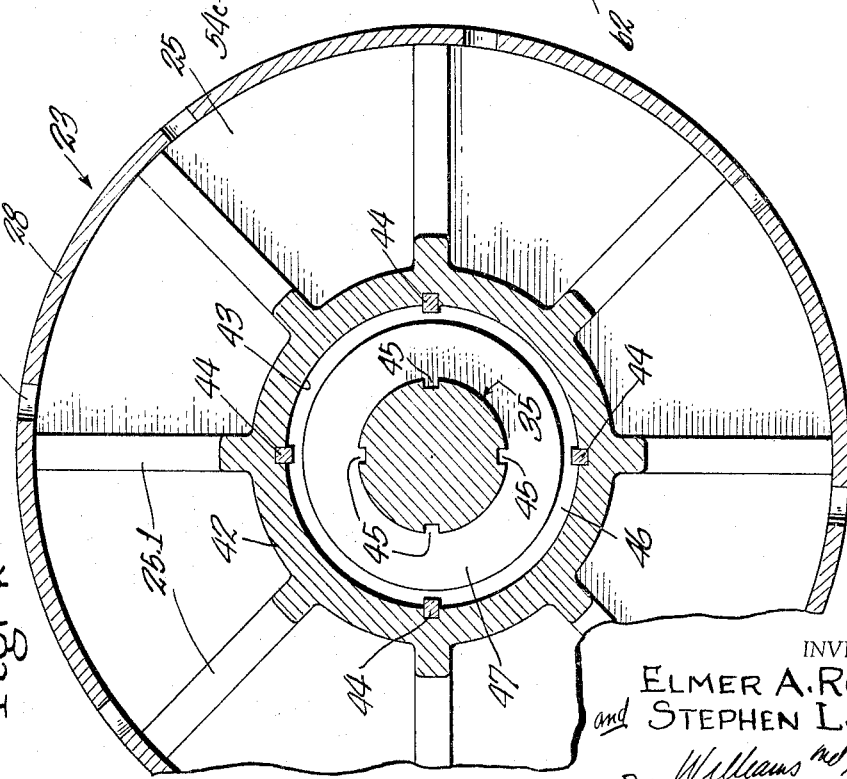

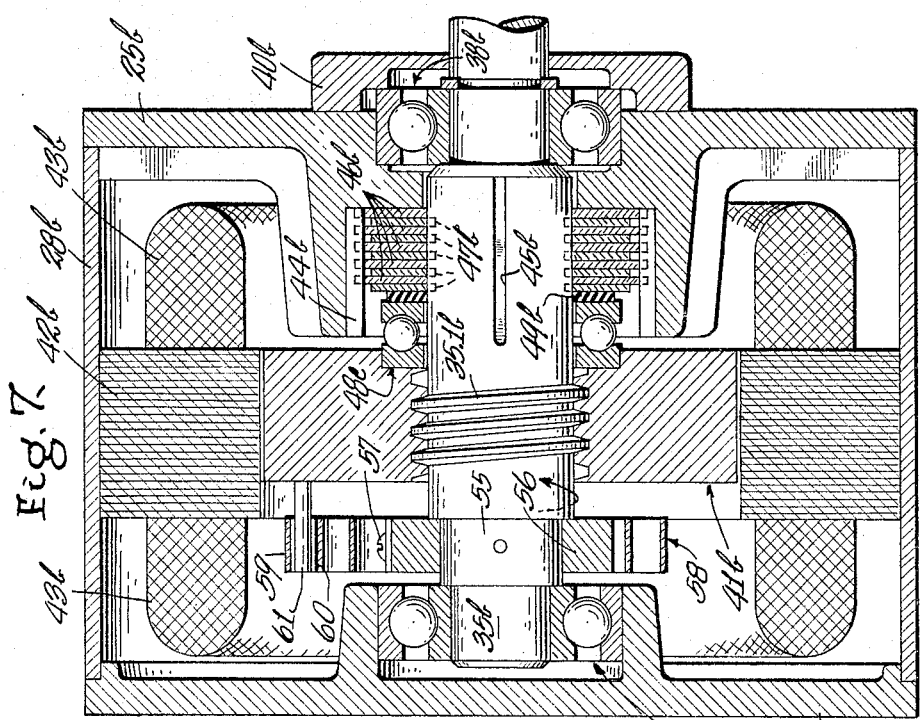

3,278,774
CLUTCH-BRAKE DEVICE AND ACTUATING
MECHANISM
Elmer A. Roller and Stephen L. Pop, Warren, Ohio, assignors to Peerless Electric Division of H. K. Porter Company, Inc., Warren, Ohio
Filed Mar. 20, 1962, Ser. No. 180,974
11 Claims. (Cl. 310—76)

The present invention relates to a novel linear actuating mechanism and to clutches and/or brake devices operated by such mechanism, and the principal object of the invention is to provide new and improved mechanisms and devices of the character described.

Fluid cylinders have long been used as linear actuators despite many inherent disadvantages. Some of these disadvantages are frequent maintenance, the necessity of a source of pressurized fluid, difficulty of accurately adjusting the force exerted, and rapidly mounting costs as stroke is increased.

Where the disadvantages of fluid cylinder actuators have outweighed their advantages, electric solenoids have been used where the stroke required has been short and where the force to be applied has been relatively low. Solenoids, however, are notably inefficient and any material stroke adjustment, other than by external linkage is virtually impossible without large losses in the exerted force.

Linear actuators employing an electric motor as a power source are quite practical where long strokes are required and/or high forces need be exerted. Heretofore, however, such devices have been relatively expensive, heavy and bulky.

The present linear actuator, while employing a type of electric motor as a power source, is little, if any, more expensive than an electric motor alone and in at least one embodiment, is no more complicated, heavy or bulky. Additionally, the present actuator may in part form a highly practical clutch and/or brake device usable for many purposes as will appear. Other advantages will become apparent from a study of the following description and from the drawings appended hereto.

In the drawings accompanying this specification there is shown for purpose of illustration, embodiments which the invention may assume, and in these drawings:

FIGURE 1 is a view in longitudinal section through a preferred embodiment of a linear actuator constructed in accordance with the present invention, FIGURE 2 is a view similar to FIGURE 1 of a modified linear actuator, FIGURE 3 is an enlarged longitudinal sectional view through a clutch-brake unit having an electric motor drive and utilizing a variation of the novel linear actuator principle illustrated in FIGURES 1 and 2, FIGURE 4 is a sectional view generally corresponding to the line 4—4 of FIGURE 3, FIGURE 5 is an exploded perspective view of certain details seen in FIGURES 3 and 4, FIGURE 6 is a diagrammatically illustrated control circuit which may be employed in conjunction with the structure seen in FIGURE 3, FIGURE 7 is a view similar to FIGURE 3 but of a brake unit alone, FIGURE 8 is an end elevational view of the embodiment of FIGURE 7 but with parts on the near side removed to show the underlying structure, and FIGURE 9 is a view similar to FIGURE 7 but of a modified brake structure.

With reference to FIGURE 1, there is shown what markedly resembles an electric motor having end frames 10, 11 separated by a tubular intermediate housing 12. Although not shown, any suitable means may be employed to retain the end frames 10, 11 and the housing 12 in assembled relation, a very common expedient used for such purpose being elongated bolts which extend between the end frames and are tensioned to draw them tightly against respective ends of the housing 12.

Centered between the end frames 10, 11 and secured within the housing 12 is a stator 13 having suitable windings 14. Rotatably supported within the stator 13 in a manner to be disclosed is a rotor 15 which is elongated for a purpose to appear. At the present time, stator 13 and rotor 15 are similar to those found in an alternating current induction motor of the type known as a torque motor; that is, a motor which will not be damaged even though its rotor is locked against rotation while current is being fed through the stator windings.

While a detailed description of the motor 15 and the stator 13 is believed to be unnecessary, it may briefly be stated that when alternating current is fed to the stator windings, a rotating magnetic field is produced. This field acts upon the magnetically permeable rotor to cause rotation thereof. If the rotor is held against rotation, the rotating field merely exerts a torque tending to rotate the rotor.

Returning once again to the more specific structure seen in FIGURE 1, it is to be understood that rotor 15 is affixed to a shaft 16 for unitary movement therewith. A primary distinction between the structure of FIGURE 1 and conventional motors is that shaft 16 is externally threaded and has threaded engagement with the end frames 10, 11 whereby rotation of the shaft 16 relative to the stator, end plates and housing causes axial movement of the rotor-shaft assembly.

In order to accommodate axial movement of the rotor, the end plates are spaced apart a distance dictated by the total amount of stroke required. Also, rotor 15 is elongated so that it will remain within the magnetic field produced by the stator 16 despite axial rotor movement. Intermediate each end frame 10, 11 and the rotor 15, a helical spring 17 is disposed to cushion the impact of the axially moving rotor as it approaches the end of its travel. Finally, one end of shaft 16, such as the right-hand end, may rotatably carry a clevis 18 to which may be connected whatever mechanism is to be operated by the linear actuator.

With the position of parts seen in full lines in FIGURE 1, rotor 15 and shaft 16 are at their extreme left-hand position. If electrical energy is now fed to the stator windings 14 in a manner to cause rotation of the rotor and shaft in the direction indicated by the arrow, the rotor and shaft assembly will move to the right until further movement is stopped at the phantom line position of parts illustrated, by abutment of the rotor with the right-hand spring 17. Conversely, if the electrical connections to stator windings 14 are reversed, the rotor-shaft assembly will be rotated in the opposite direction by the now reversely rotating magnetic field to thus shift the rotor-shaft assembly to the left to the full-line position shown.

It will be understood that even though a relatively light torque (rotative force) is exerted by the rotor 15, the pitch of the threads on the shaft 16 (or the axial distance between adjoining thread turns) can be such that a considerable axial force will be exerted by the shaft. Also, as will hereinafter be more specifically disclosed with respect to FIGURE 3, the torque exerted by the rotor and thus the axial force exerted by the shaft may readily and accurately be controlled by varying the voltage applied to the stator windings. As will appear, it is a relatively simple matter to cause the device to exert one force in one direction and a considerably different force in the opposite direction, if desired, merely by varying the applied voltage. As a further extension of this control principle, the force exerted may be varied at different portions of a single stroke where this would prove advantageous. For example, a high force could be exerted at the initiation of a stroke and such force could be reduced toward the end of the stroke merely by feeding high voltage to the stator windings during the initial stages of the stroke and reducing the voltage during subsequent stroke stages.

Turning now to the embodiment of the invention seen in FIGURE 2 wherein similar parts are identified with the same reference characters as before but with the suffix *a* added, it may briefly be stated that a principal difference between this embodiment and the one previously described is that rotor 15*a* is held against axial movement while shaft 16*a* is adapted to be held against rotation.

With reference to the specific structural differences of the embodiment seen in FIGURE 2, end plates 10*a*, 11*a* have enlarged bosses 19 which support respective bearing assemblies 20 whereby the rotor is free to rotate on the bearing assemblies but is restricted against axial movement. It will be noted that without axial rotor movement, the end plate-housing assembly may be made much shorter in length than the previously described embodiment although the stroke is the same.

Although shaft 16*a* is externally threaded like shaft 16, it has rotatable, threaded engagement with the rotor while passing freely through enlarged apertures 21 in the end plates. Clevis 18*a*, which is adapted to be connected to the mechanism to be operated by the actuator, is herein shown to be integral with the shaft and is presently relied upon to retain it against rotation.

With the parts positioned in their full-line positions and assuming clevis 18*a* is connected to the mechanism to be operated and is held against rotation thereby, operation will be as follows: If electrical energy is fed to the stator windings 14*a* in manner to cause rotor 15*a* to rotate in the direction of the arrow, the non-rotatable shaft 16*a* will be shifted to the right because of its threaded connection with the rotor. Conversely, rotation of rotor 15*a* in the opposite direction will shift shaft 16*a* to the left.

Thus far, no means have been disclosed to limit axial travel of shaft 16*a* since it can be assumed that the mechanism to which clevis 18*a* is attached will serve this purpose; however, if desired, a suitable collar 211 could be secured to the shaft 16*a* to interrupt axial shaft movement to the right when it abuts the end plate 10*a*. Obviously, a similar collar could be carried by the other end of shaft 16*a* to limit its movement to the left. Also, the interruption of shaft movement could be cushioned, if desired, by the use of helical springs intermediate each collar and its respective end plate. The use of means such as the collar 21 is particularly advantageous since it may be threaded to various positions along the shaft to thus provide a simple, effective, yet easily changed mode of stroke adjustment.

In the embodiment seen in FIGURE 3, the invention thus far disclosed is shown applied to a motor, clutch-brake mechanism. This mechanism comprises a motor section 22 in end-to-end relation with a clutch-brake section 23. Motor section 22 has an end frame 24, clutch-brake section 23 has an end frame 25, and an intermediate frame 26 is common to both sections and divides one from the other. A tubular housing 27 extends between frames 24 and 26 while a similar housing 28 extends between frames 25 and 26. Any suitable means, such as the bolts described in reference to FIGURE 1, may be employed to retain the frames and housings in the assembled relation shown.

Turning now to the motor unit 22, the latter may comprise a stator 29 secured within the housing 27 and having suitable windings 30. Peripheral openings 29.1 may be formed in the stator for air circulation therepast. If desired, instead of forming openings through the stator, its periphery may be made non-circular, such as by forming flats therein, so as to provide space for circulation of air between the stator periphery and the interior of the housing.

Rotatably supported within the stator 29 is a rotor 31 which may be keyed at 31.1 to a shaft 32. Such shaft has reduced diameter portions 32.1 which fit within respective bearing assemblies 33. As illustrated, the left bearing assembly is received within a recess formed in a boss 24.1 provided by the end frame 24 and the right bearing assembly is received within a recess formed in a boss 26.1 provided by the intermediate frame 26. A series of apertures 31.2 may be formed in the rotor 31 for passage of air therethrough and for a similar purpose, a series of apertures 26.2 may be formed in frame 26 adjacent its periphery.

Shaft 32 extends through an aperture in frame 26 and a member 34 is secured to the shaft for unitary rotation therewith by means of, for example, a key 34.1. Member 34 has a hub-like portion 34.2 and at its left end a radially outwardly projecting flange portion 34.3. A series of fins 34.4 are herein shown formed integrally with the flange and hub of member 34, such member thus functioning as a fan to circulate cooling air through the mechanism in a manner to appear.

With the construction thus far disclosed, it is to be understood that when electrical energy is fed to stator windings 30, rotor 31, shaft 32 and member 34 will be unitarily rotated in the direction of the arrow. As will later appear, motor shaft 31 will be continuously rotated, member 34 functioning as a fan, a flywheel and as part of a clutch assembly.

Turning now to clutch-brake section 23, a shaft 35 is disposed in end-to-end, axially aligned relation with shaft 32 and has its left end rotatably supported by a bearing assembly 36 mounted within a recess 37 in the member 34. The right end of shaft 35 is rotatably supported by a bearing assembly 38 clamped in a recess 39 in end frame 25 by means of a bearing retainer plate 40 through which the shaft 35 projects for connection to whatever apparatus is to be driven and braked by the present mechanism.

Intermediate the bearing assemblies 36, 38, the shaft 35 is provided with external screw threads 35.1 and a rotor 41 is rotatably supported by the shaft 35 and has internal threads cooperable with the shaft threads 35.1 whereby relative rotation between the shaft 35 and the rotor 41 causes axial rotor movement. Encircling the rotor 41 is a stator 42 which is suitably secured to the housing 28 and has windings 43. In a manner similar to stator 29 and rotor 31 and for the same purpose, apertures 42.1 and 41.1 are respectively formed in stator 42 and rotor 41. It will be understood that stator 42 and rotor 41 form an alternating current, induction torque motor as previously described with respect to FIGURES 1 and 2.

Clutch-brake section 23 may be further divided into a clutch section A and a brake section B and turning first to the latter, end frame 25 is provided with an enlarged boss 42 having a recess 43 facing the rotor 41 (see also FIGURE 4). Inset into the periphery of recess 43 to project radially inwardly thereof are a plurality of keys 44, herein shown to be four in number, evenly spaced about the recess. Additionally, the portion of shaft 35 within the recess 43 is provided with a plurality of keyways 45 herein shown to be four in number and evenly spaced about the shaft.

Disposed in side-by-side relation within the recess 43 and about the shaft 35 are a plurality of friction members 46 and 47 which may be formed of steel, brass or other suitable material. At the present time such members preferably take the form of disks and, as seen in FIGURE 5, each disk member 46 has an outside diameter to slidably fit within the recess 43, an inside diameter to slidably fit about adjoining portion of shaft 35 and four peripheral notches 46.1 for closely but slidably fitting the previously mentioned keys 44. On the other hand, disk member 7 has an outside diameter small enough to clear the keys 44, an inside diameter to slidably fit about the adjoining portion of shaft 35, and four inwardly projecting tongues 47.1 for closely but slidably fitting within the previously mentioned shaft keyways 45.

As best seen in FIGURE 3, the disk members 46, 47 are adapted to be disposed in recess 43 and about shaft 35 in alternate relation. The disk members are free to move axially of each other and axialy along the shaft and recess; however, disks 46 are held against rotation by the keys 44 while the disks 47 are unitarily rotatable with the shaft 35 since the disk tongues 47.1 are disposed in the shaft keyways 45.

For a purpose to appear, a thrust bearing assembly 48 is interposed between the rotor 41 and the just-described stack of disks 46, 47 and a compressible member 49, herein shown to comprise a washer of rubber-like material, is interposed between the bearing assembly 48 and the disk stack.

Turning now to the clutch section C, the latter is similar to brake section B and therefore corresponding parts are identified by the same reference characters but prefixed by the numeral "1." Obviously, in the case of the clutch section, recess 143 is formed in the hub 34.2 of the fan-flywheel member 34 and thus the disks 146 are unitarily rotatable with the latter while the disks 147, like disks 47, are unitarily rotatable with the shaft 35.

Since considerable heat may be generated by the brake section B, end frame 25 is formed with radially extending cooling fins 25.1 (see FIGURES 3 and 4) and the housing 28 is formed with a plurality of openings 28.1 adjacent frame 25 for the entrance of cooling air. At the other end of the mechanism, end frame 24 is formed with a series of openings 24.1 for the exit of heated air. Finally, and to improve flow of cooling air through the mechanism, a centrally apertured plate 50 is secured to housing 28 in any suitable manner intermediate the stator winding 43 and the fan-flywheel flange 34.3.

In the operation of the apparatus shown in FIGURE 3 and assuming that rotor 31, shaft 32 and fan-flywheel 34 are rotating in the direction of the arrow, the parts are shown in position wherein the brake section B is holding shaft 25 against rotation. Such function of the braking section has been accomplished by so energizing stator windings 43 that the rotating magnetic field exerted thereby tends to rotate rotor 41 in the opposite direction of rotation as the motor shaft 32. This has caused the rotor to travel along shaft threads 35.1 to the right to force the friction disks 46, 47 into face-to-face engagement. With these disks in engagement and with disks 46 keyed to the end frame 25 and disks 47 keyed to the shaft 35, the latter will be locked to the end frame 25 and disks 47 keyed to the shaft 35, the latter will be locked to the end frame 25 which is, of course, supported in fixed position.

Note that since rotor 41 is biased to the right, disks 146, 147 of the clutch section C are free of engagement with each other to permit relative rotation therebetween. Accordingly, disks 146 may rotate freely with the fan-flywheel member 34 while the disks 147 are held stationary by the non-rotating shaft 35.

When it is desired to couple shaft 35 to the rotating motor shaft 32, current flow through the stator windings 43 will be reversed to create a rotating magnetic field which rotates rotor 41 in the same direction as shaft 32. Rotation of rotor 41 in this manner causes it to travel alog the shaft threads 35.1 to the left to force disks 146, 147 into frictional engagement and to simultaneously permit axial separation of the disks 46, 47. Note that the thrust bearing assembly 148 insures that no friction will be developed between the rotor 41 and the stack of disks of the clutch section C which would tend to cause erratic clutch action. Note also that the resilient washer 149 cushions the impact as rotor movement to the left is interruped by abutment of the disks 146, 147.

With disks 146, 147 in frictional engagement, shaft 35 will be coupled to shaft 32 for rotation therewith; rotor 41 continuing to rotate with the shaft 35 to add its torque to that exerted by the motor shaft 32. Since disks 46, 47 are now free of engagement with each other, the disks 47 freely rotate with the shaft 35 while the disks 47 remain stationary. It is to be noted that since disks 146, 147 will remain in engagement only so long as rotor 41 is exerting a compressive force thereon, it is necessary that the magnetic field of stator 42 must tend to rotate the rotor 41 at a speed at least as fast as that of shaft 35 (and also shaft 32 and, rotor 31) since all rotate together so long as the shaft 35 remains coupled to shaft 32.

When shaft 35 is to be uncoupled from shaft 32, current flow through stator windings 43 will again be reversed to cause rotation in the direction opposite to shaft 32. Rotor 41 will thereupon travel along the threads 35.1 to the right to the position shown in FIGURE 3 wherein the disks 146, 147 of the clutch section C are out of engagement and the disks 46, 47 of the brake section B are in engagement. Upon application of the brake, bearing assembly 48 and resilient member 49 function in a manner similar to that previously described with respect to bearing 148 and member 149.

Since considerable heat is generated by the clutch-brake section 23, especially while the brake is locked since rotor 41 is also locked against rotation while current is being fed through the stator windings 43, it is considered important that cooling air continually flow through the assembly, under the impetous of the continuously rotating fan-flywheel member 34, in the manner illustrated in the drawing.

While omitted from the drawings in the interest of simplicity, it may be desirable to provide means for insuring axial separation of the friction disks of each set, thus minimizing friction, at all times except when the rotor is forcing the disks together. This may readily be accomplished by interposing a suitable spring member between certain of the disks of a set to lightly force them to axially separated relation.

With reference now to FIGURE 6, there is diagrammatically illustrated a simple electrical circuit for controlling operation of the clutch-brake section 23 of FIGURE 3. Connected across the power lines L–1, L–2 is an adjustable transformer 51 having a variable voltage output which is fed to the stator windings 43 through a reversing switch 52. In the illustrated full-line position of the switch, the stator windings are so energized that rotor 41 is in the position seen in FIGURE 3 wherein the clutch is disengaged and the brake is engaged. When, however, switch 52 is disposed in its phantom-line position, the stator windings are so energized that rotor 41 will be shifted to the left to engage the clutch and disengage the brake.

Transformer 51 may readily be adjusted so that the desired clutching and braking forces will be exerted and, although not shown, it is easily possible to feed one voltage to the stator windings for engaging the clutch and yet another voltage for engaging the brake. Additionally, one voltage may be employed to shift the rotor to either of its extreme positions and another may be employed to retain it in such position.

In the embodiment seen in FIGURES 7 and 8, there is shown a brake unit alone which is very similar to the brake section B of FIGURE 3. Accordingly, parts corresponding to those illustrated in FIGURE 3 are identified by the same reference characters but with the suffix "*b*" added.

The omission of the motor section 22 of FIGURE 3 from this embodiment and also the omission of clutch section C necessitates certain structural changes. Therefore, the left end of shaft 35*b* is rotatably supported by a bearing assembly 53 which may be identical to bearing assembly 38*b* and which is supported by the left end frame 54.

In the embodiment herein disclosed, it is desirable to make the brake structure of the "fail-safe" type. That is, in the event of current failure the brake will automatically be applied. To this end, therefore, shaft 35*b* is reduced in diameter at 55 and pinned or otherwise secured thereto is a collar 56. Secured to collar 56, as by means of a screw 57, is one end of a torsion spring 58 whose opposite end is looped at 59 to receive a sleeve 60 which is slidable on a pin 61 anchored to the rotor 41b adjacent its periphery.

In the position of parts shown, spring 58 has biased rotor 41b in a clockwise direction (FIGURE 8) to thus cause the rotor to advance along shaft threads 35.1b to the right to urge the disks 46b, 47b together to thus restrain rotation of shaft 35b.

To release the brake, current will be fed to the stator windings 43b in manner to cause rotation of rotor 41b in a counterclockwise direction (FIGURE 8) against the force of spring 58, to thus cause the rotor to advance along the shaft threads to the left thus allowing the disks 46b, 47b to separate. With the disks separated, the shaft may freely be rotated in the direction of the arrow seen in FIGURE 7; that is in the same direction in which the rotor is being rotated by the stator.

When the brake is to be applied, current to the stator windings 43b will be cut off whereupon spring 58 will rotate rotor 41b relative to its shaft 35b in the previously mentioned clockwise direction to cause the rotor to advance to the right along the threads 35.1b to thus force the disks 46b, 47b together to thereupon stop rotation of the shaft 35b. Note that in the event of a power failure, the brake will immediately be applied by the spring 58.

While not specifically shown since it is believed to be unnecessary, it will be understood that a clutch unit alone, rather than a clutch-brake unit as illustrated in FIGURE 3, may be provided if desired. Such a unit could be similar to the structure of FIGURE 3 with the exception that the brake section B would be omitted. Furthermore, it will be understood that shaft 32 need not form a part of an electric motor but could be driven by any other suitable device.

In the brake structure shown in FIGURE 4, it will be recalled that this embodiment will only function properly if shaft 35b rotates in the direction of the arrow. The structure could, of course, be designed to permit shaft rotation in the opposite direction by reversing spring 58 and the pitch of threads 35.1b; however, rotation of this shaft can only occur in a single direction depending upon how the structure is designed. For some purposes, it is desirable to provide a brake which can with no changes, operate in either direction of shaft rotation, such a brake being illustrated in FIGURE 9.

Since the embodiment illustrated in FIGURE 9 is similar in many respects to those shown in FIGURES 3 and 7, corresponding parts are identified with the same reference characters but with the suffix "c" added. In this embodiment, it is to be noted that shaft 35c is divided into two parts: a fixed part 62, pinned or otherwise anchored in the end frame 54c and which carries the threads 35.1c, and a rotatable part 63 which is adapted to be connected to the apparatus which is to be braked. The left end of shaft portion 63 is reduced in diameter at 64 and fits within a recess in the end of shaft portion 62, a suitable needle bearing assembly 65 or the like rotatably supporting the left end of shaft portion 63. When unrestricted rotation of this shaft portion is to be provided, stator windings 43c will be energized in manner to cause the rotor to move along the threads 35.1c to the left, against the force exerted by the spring 58c, thus permitting separation of the disks 46c, 47c and rotation of shaft portion 63 in either direction.

To stop rotation of shaft portion 63, it is only necessary to cut flow of current to stator windings 43c whereupon spring 58c will shift rotor 41c along the threads 35.1c to the right to force the disks 46c, 47c together once again.

In view of the foregoing it will be apparent to those skilled in the art that we have accomplished at least the principal object of our invention and it will also be apparent to those skilled in the art that the embodiments herein described may be variously changed and modified, without departing from the spirit of the invention, and that the invention is capable of uses and has advantages not herein specifically described; hence it will be appreciated that the herein disclosed embodiments are illustrative only, and that our invention is not limited thereto.

We claim:
1. A clutch-brake unit comprising a rotatably mounted drive shaft, a pair of cup-shaped members at one end of said drive shaft in facing, spaced-apart axially aligned relation with each other and with such shaft, one of said members being fixed against rotation and the other being rotatable in unit with said drive shaft, a rotatably mounted driven shaft within said cup-shaped members and in end-to-end, axially aligned relation with said drive shaft, two friction disk sets through which said driven shaft extends and each set being disposed within a respective cup-shaped member with one disk of each set keyed to said driven shaft for unitary rotation therewith and the other disk of each set keyed to respective cup-shaped members and the friction disks of each set being relatively movable toward and away from frictional engagement in a direction axially of said driven shaft, a rotor member mounted on said driven shaft between said friction disk sets and having screw connection with such shaft whereby rotation of said rotor member relative to such shaft effects axial movement of said rotor member toward and away from said friction disk sets to provide for engagement and disengagement of their friction disks, and means providing a magnetic field exerting a force tending to rotate said rotor member in one direction to release said driven shaft for rotation and to couple said driven shaft to said drive shaft for rotation therewith through the engaged friction disks of one of said friction disk sets and for exerting a force tending to rotate said rotor member in the opposite direction to uncouple said driven shaft from said drive shaft and to impede rotation of said driven shaft through the engaged friction disks of said other friction disk set.

2. The construction of claim 1 wherein said drive shaft is continuously rotated in a predetermined direction by an alternating current electric motor having a predetermined synchronous speed, wherein rotation of said rotor member by said magnetic field in manner to couple said driven shaft to said drive shaft is in the same direction as rotation of the latter, and wherein said means providing said magnetic field and said rotor member form an alternating current electric motor having a synchronous speed not materially less than that of the motor aforesaid rotating said drive shaft.

3. The construction of claim 1 wherein thrust bearing means is disposed on each side of said rotor member intermediate the latter and respective friction disk sets.

4. The construction of claim 3 wherein cushioning means retards axial body movement.

5. The construction of claim 4 wherein said cushioning means comprises a compressible member intermediate said rotor member and friction member set.

6. In combination: a support, a shaft rotatably mounted on said support, a pair of friction members movable relative in one direction axially of said shaft for interengagement and in an opposite direction axially of said shaft for disengagement, one of said members being rotatable with said shaft and the other connected to a part of said support, means producing a magnetic field, a body disposed within said field and influenced thereby to rotate about the shaft axis, said body also being axially movable and having connection with one of said friction members to axially move the latter, and screw threads operable to positively shift said body axially when it rotates.

7. The construction of claim 6 and further including resilient means yieldably opposing rotation of said body.

8. The construction of claim 7 wherein said resilient means normally rotates said body in a direction which is opposed to the direction of rotation influenced by said field.

9. The construction of claim 8 wherein said other of said frictional members is connected to a fixed part of said support and against rotation, wherein rotation of said body by said resilient means moves said body axially to press said friction members together to act as a brake on said shaft, and wherein rotation of said body under influence of said field moves said body axially to release pressing force against said frictional members to permit rotation of said shaft.

10. In combination: a pair of relatively rotatable shafts in end-to-end axially aligned relation, a pair of friction members, one connected to and rotatable with one shaft and the other connected to and rotatable with the other shaft, said friction members being relatively movable axially of said shaft and of each other to frictional engagement to thus connect said shafts in driving relation, and said friction members being relatively movable away from each other to disconnect driving relation between said shafts, means producing a magnetic field, a body mounted on and about one of said shafts and disposed within said field and influenced thereby to rotate, said body having screw connection with said one shaft so that rotation of said body threads the latter axially along said shaft, said body having connection with one of said friction members to axially move the latter.

11. The construction of claim 10 wherein said magnetic field rotates said body in one direction to axially thread said body along said one shaft and effect frictional engagement of said friction members, and wherein the other of said shafts is continuously rotatable in the same direction as said one direction.

References Cited by the Examiner
UNITED STATES PATENTS

| | | | |
|---|---|---|---|
| 417,086 | 12/1889 | Pratt | 310—78 |
| 2,366,739 | 1/1945 | McCoy. | |
| 2,446,393 | 8/1948 | Russell. | |
| 2,482,464 | 9/1949 | Chapman. | |
| 2,666,509 | 1/1954 | Jaggi | 310—78 |
| 2,710,359 | 6/1955 | Nixon | 310—76 |
| 2,739,251 | 3/1956 | Ingalls | 310—76 |
| 2,805,375 | 9/1957 | Morgan | 310—83 |
| 2,860,266 | 11/1958 | Schrader | 310—83 |
| 2,956,188 | 10/1960 | White | 310—83 |
| 2,978,621 | 4/1961 | Martinek | 310—83 |
| 3,082,335 | 3/1963 | Lancey | 310—78 |

MILTON O. HIRSHFIELD, *Primary Examiner.*

ORIS L. RADER, *Examiner.*

A. J. ROSSI, *Assistant Examiner.*